(12) United States Patent  (10) Patent No.: US 9,014,520 B2
Yanagisawa  (45) Date of Patent: Apr. 21, 2015

(54) PHOTOELECTRIC MIXED SUBSTRATE AND OPTICAL MODULE

(71) Applicant: Shinko Electric Industries Co., Ltd., Nagano-ken (JP)

(72) Inventor: Kenji Yanagisawa, Nagano-ken (JP)

(73) Assignee: Shinko Electric Industries Co., Ltd., Nagano-ken (JP)

( * ) Notice: Subject to any disclaimer, the term of this patent is extended or adjusted under 35 U.S.C. 154(b) by 0 days.

(21) Appl. No.: 14/296,777

(22) Filed: Jun. 5, 2014

(65) Prior Publication Data
US 2014/0369642 A1  Dec. 18, 2014

(30) Foreign Application Priority Data
Jun. 12, 2013  (JP) ................................. 2013-123953

(51) Int. Cl.
*G02B 6/12* (2006.01)
(52) U.S. Cl.
CPC ................. *G02B 6/12002* (2013.01)
(58) Field of Classification Search
CPC ........ G02B 6/12; G02B 6/13; G02B 6/12004; G02B 6/122; G02B 6/4214; G02B 6/43
USPC .................. 385/14, 15, 31, 39, 129, 130, 131
See application file for complete search history.

(56) References Cited

U.S. PATENT DOCUMENTS 7,251,389 B2 *  7/2007  Lu et al. .......................... 385/14
7,639,912 B2 * 12/2009  Wang et al. ..................... 385/39

FOREIGN PATENT DOCUMENTS

| JP | 10-48449 A | 2/1998 |
| JP | 2002-258117 A | 9/2002 |
| JP | 2006-140233 A | 6/2006 |

* cited by examiner

*Primary Examiner* — Jennifer Doan
(74) *Attorney, Agent, or Firm* — Wolf, Greenfield & Sacks, P.C.

(57) ABSTRACT

A photoelectric mixed substrate includes a wiring substrate including a first ground wire, a signal wire arranged above the first ground wire and electrically connected to the photoelectric component and the electronic component, and a waveguide unit stacked on the wiring substrate to cover the signal wire. The waveguide unit includes a first clad layer formed on the wiring substrate, a second ground wire formed above the first clad layer, a core formed on the first clad layer and optically coupled to the photoelectric component, and a second clad layer formed on the first clad layer to cover the core.

5 Claims, 7 Drawing Sheets

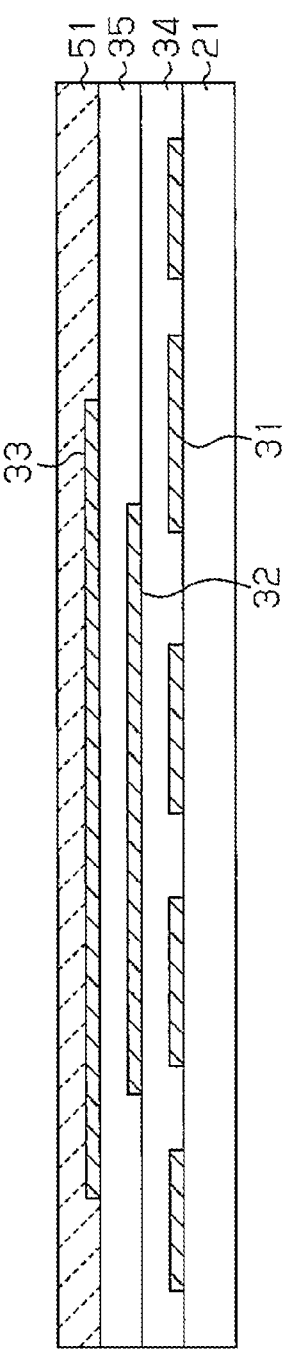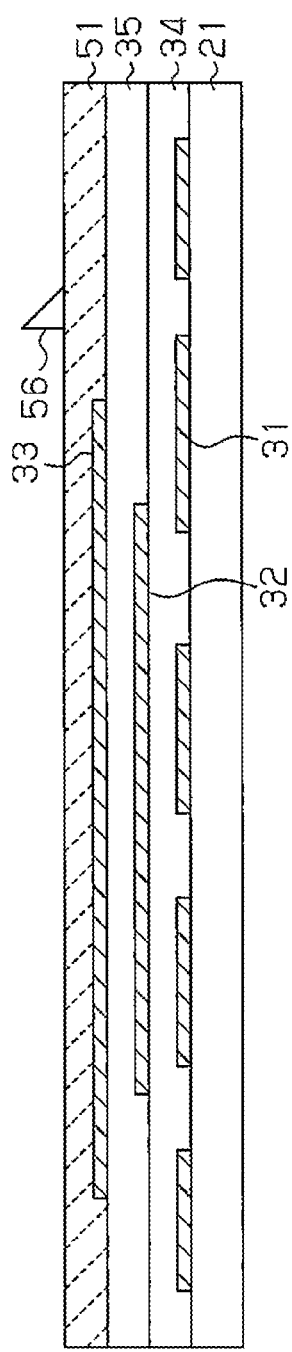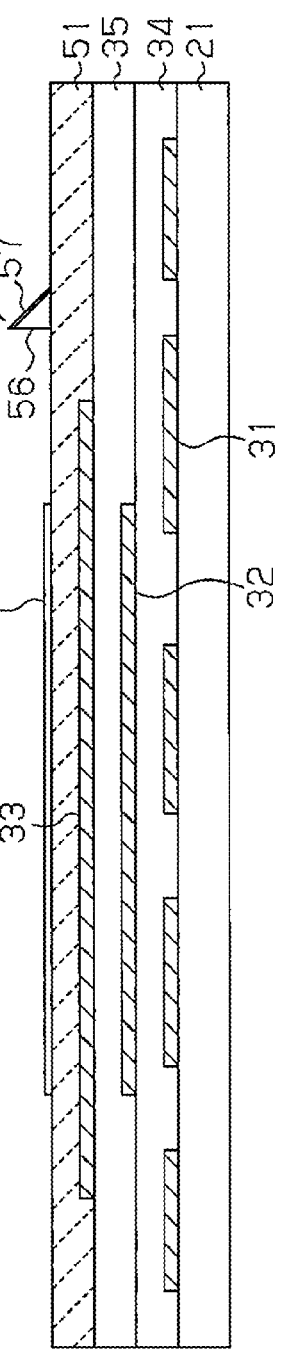

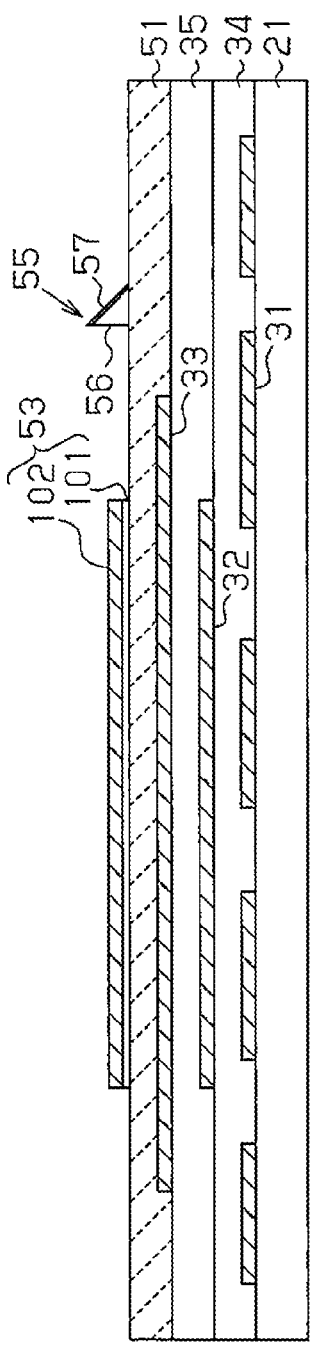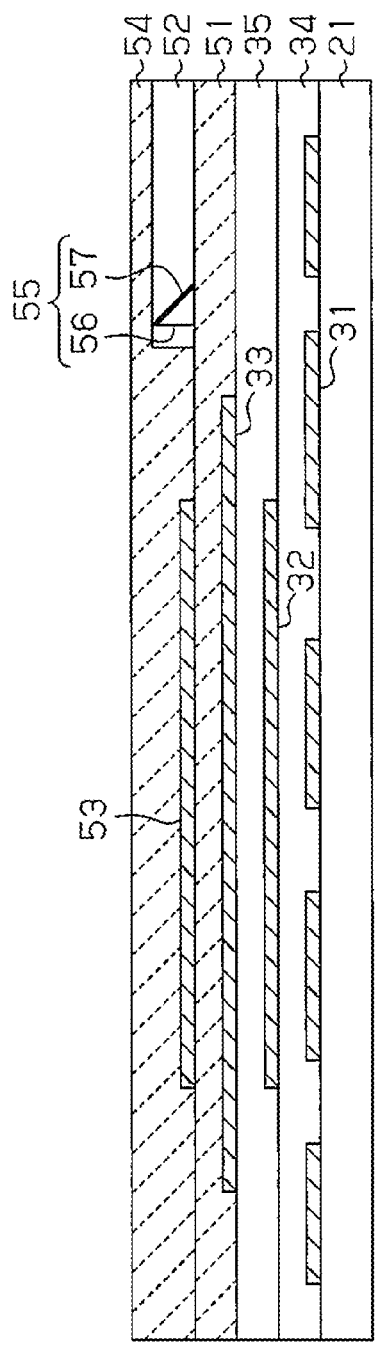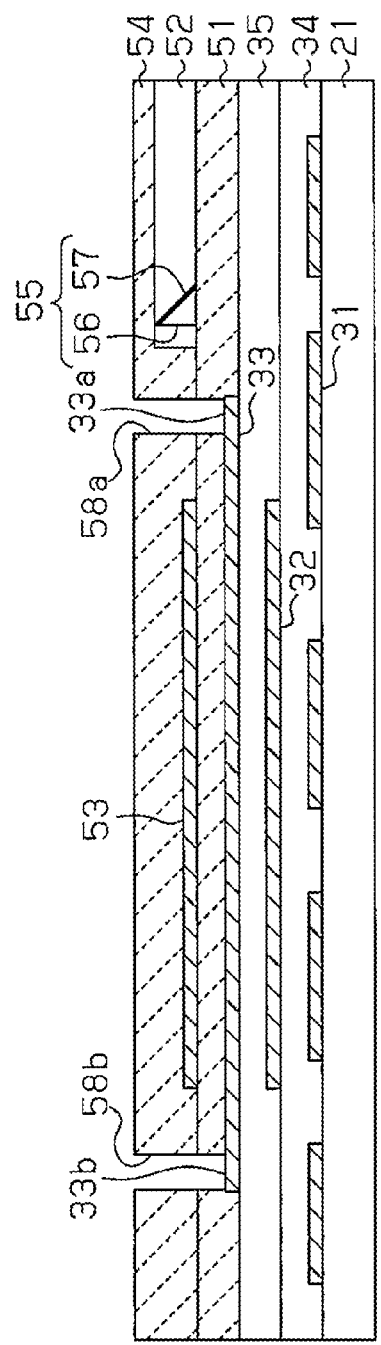

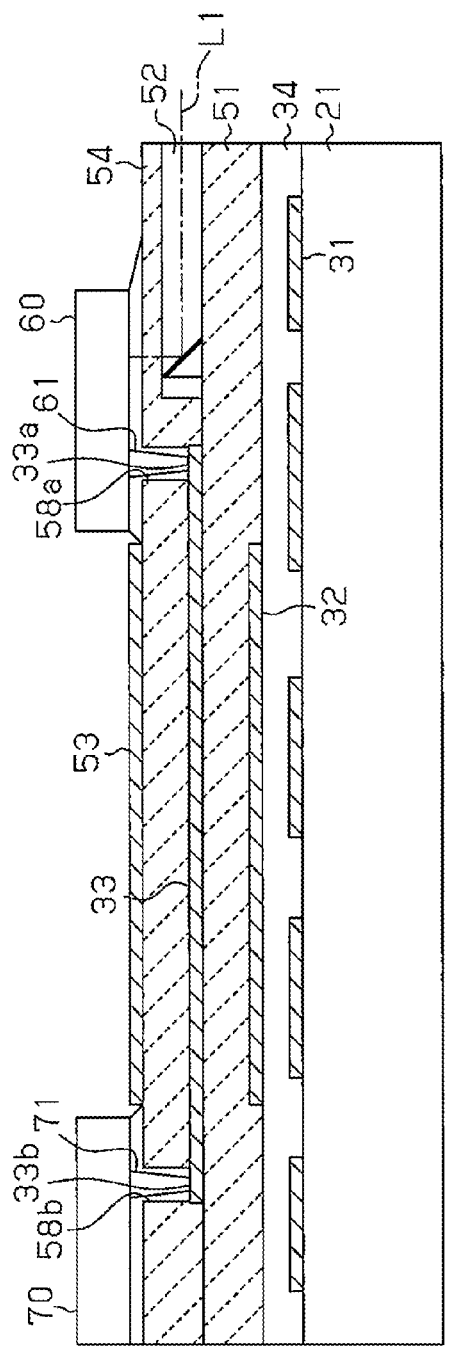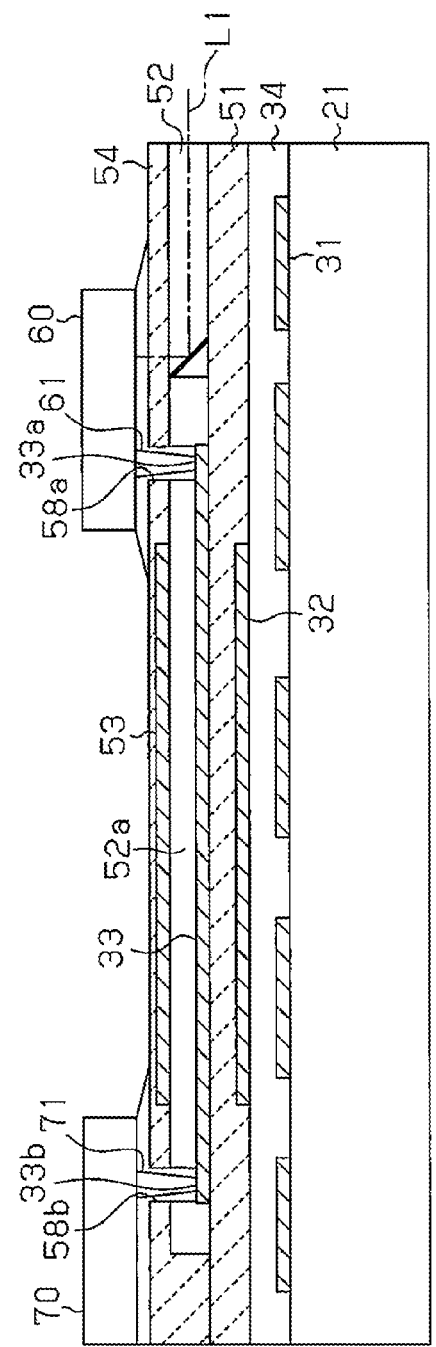

PHOTOELECTRIC MIXED SUBSTRATE AND OPTICAL MODULE

CROSS-REFERENCE TO RELATED APPLICATIONS

This application is based upon and claims the benefit of priority from prior Japanese Patent Application No. 2013-123953, filed on Jun. 12, 2013, the entire contents of which are incorporated herein by reference.

FIELD

This disclosure relates to a photoelectric mixed substrate and an optical module.

BACKGROUND

The speed of information communication has been increasing. The use of electric signals in the information communication hinders increases in communication speed. Optical signals allows for information to be conveyed at higher speeds. Japanese Laid-Open Patent Publication Nos. 2002-258117, 2006-140233, and 10-48449 each describe an example of a photoelectric mixed substrate that includes metal wires for transmitting electric signals, optical waveguide for transmitting optical signals, light emitting elements for converting electric signals to optical signals, and light receiving elements for converting optical signals to electric signals.

In such a photoelectric mixed substrate, the superimposition of noise on the electric signal transmitted by the metal wires becomes a factor that inhibits high-speed transmission of electric signals.

SUMMARY

One aspect of this disclosure is a photoelectric mixed substrate on which a photoelectric component and an electronic component are mounted. The photoelectric mixed substrate includes a wiring substrate including a first ground wire. A signal wire is arranged above the first ground wire and electrically connects the photoelectric component and the electronic component. A waveguide unit is stacked on the wiring substrate and covers the signal wire. The waveguide unit includes a first clad layer formed on the wiring substrate, a second ground wire formed above the first clad layer, a core formed on the first clad layer and optically coupled to the photoelectric component, and a second clad layer formed on the first clad layer to cover the core.

Another aspect of this disclosure is an optical module. The optical module includes a photoelectric component, an electronic component, and a photoelectric mixed substrate on which the photoelectric component and the electronic component are mounted. The photoelectric mixed substrate includes a wiring substrate including a first ground wire. A signal wire is arranged above the first ground wire and electrically connects the photoelectric component and the electronic component. A waveguide unit is stacked on the wiring substrate and covers the signal wire. The waveguide unit includes a first clad layer formed on the wiring substrate, a second ground wire formed above the first clad layer, a core formed on the first clad layer and optically coupled to the photoelectric component, and a second clad layer formed on the first clad layer to cover the core.

Other aspects and advantages of the present invention will become apparent from the following description, taken in conjunction with the accompanying drawings, illustrating by example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 3A to 3C and 4A to 4C are schematic cross-sectional views illustrating procedures for manufacturing the optical module of FIG. 1;

FIGS. 5A, 5B, 6A, and 6B are schematic cross-sectional views illustrating an example of another optical module.

DESCRIPTION OF THE EMBODIMENTS

Figure 1:
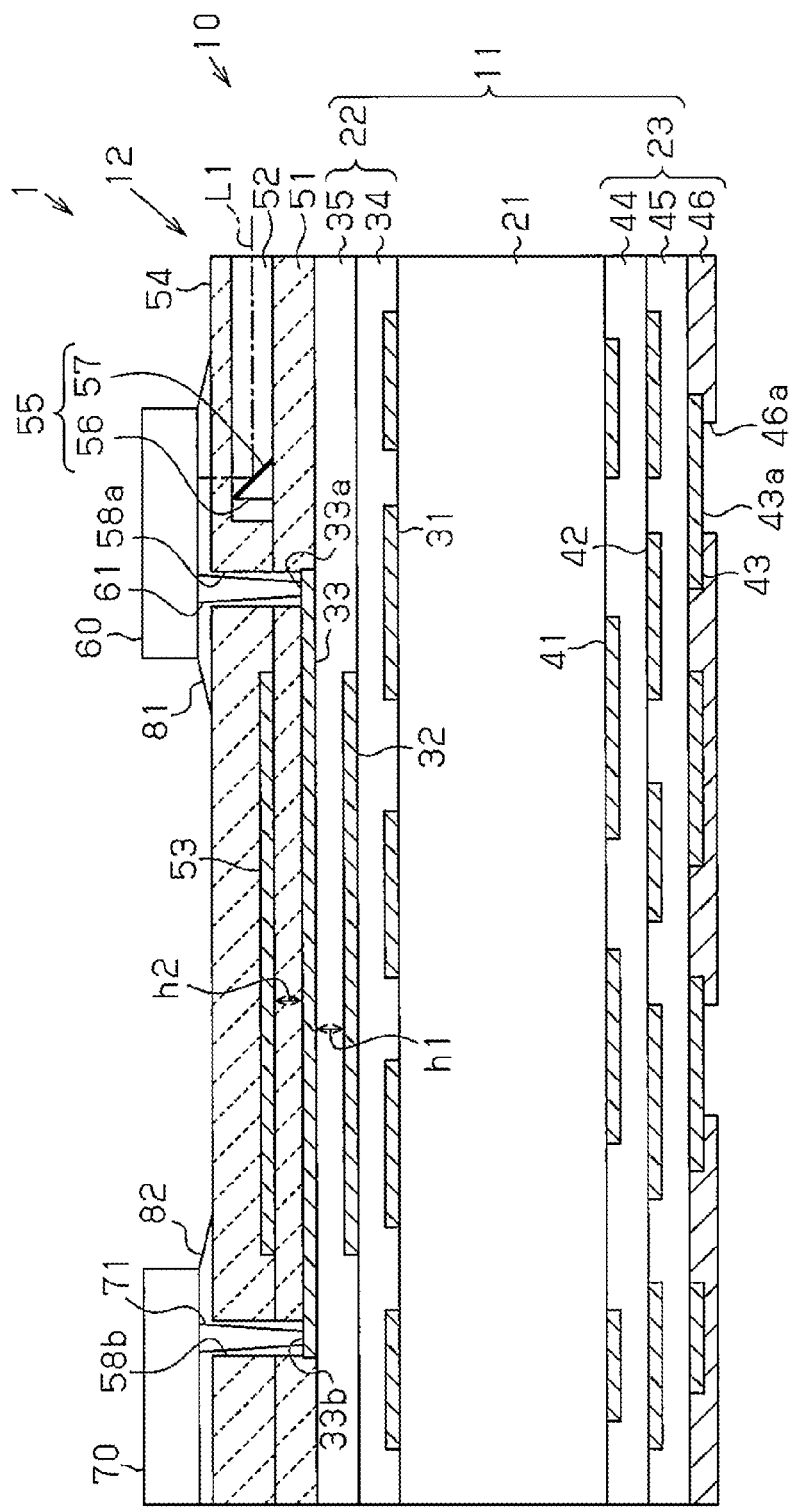
FIG. 1 is a schematic cross-sectional view of an optical module.

One embodiment will now be described with reference to the drawings. In the drawings, elements are illustrated for simplicity and clarity and have not necessarily been drawn to scale. To facilitate understanding, hatching lines may not be illustrated in the cross-sectional drawings.

As illustrated in FIG. 1, an optical module 1 includes a module substrate 10, a photoelectric component 60, and an electronic component 70. The photoelectric component 60 and the electronic component 70 are mounted on the module substrate 10. The photoelectric component 60 may include a light emitting element that converts electric signals to optical signals. Examples of a light emitting element include a vertical cavity surface emitting laser (VCSEL), a light emitting diode (LED), and the like. The photoelectric component 60 may include a light receiving element that converts optical signals to electric signals. Examples of a light receiving element include a photodiode (PD), an avalanche photodiode (APD), and the like. Further, the photoelectric component 60 may include both of the light emitting element and the light receiving element.

The electronic component 70 includes a driver that drives the photoelectric component 60. The electronic component 70 may include the driver, an amplification circuit that amplifies an electric signal, a processing circuit (Digital Signal Processor: DSP) that processes the electric signals, and the like. The electronic component 70 is a module including one or more IC chips. The module substrate 10 is an example of a photoelectric mixed substrate.

The module substrate 10 includes a wiring substrate 11, and a waveguide unit 12 arranged on a surface (upper surface in FIG. 1) of the wiring substrate 11. The wiring substrate 11 includes a substrate body 21. The substrate body 21 may be any one of a core substrate, a cored build-up substrate including a core substrate, or a coreless substrate that is free from the core substrate.

The wiring substrate 11 includes a wiring unit 22 arranged on an upper surface of the substrate body 21, and a wiring unit 23 arranged on a lower surface of the substrate body 21. The wiring unit 22 includes a wiring layer 31, a first ground wire 32, a signal wire 33, and insulation layers 34 and 35. The wiring layer 31 is formed on the upper surface of the substrate body 21. The wiring layer 31 includes a signal wire and a ground wire (power wire). The wiring layer 31 is covered by the insulation layer 34. The first ground wire 32 is formed on an upper surface of the insulation layer 34. The first ground wire 32 is connected to the ground wire of the wiring layer 31 by vias (not illustrated). The potential at the first ground wire 32 is set to a given voltage (e.g., 0 V). The first ground wire 32 is covered by the insulation layer 35. The signal wire 33 is formed on an upper surface of the insulation layer 35. The signal wire 33 electrically connects the photoelectric component 60 to the electronic component 70. The material of the wiring layer 31, the first ground wire 32, and the signal wire 33 is, for example, copper. The material of the insulation layers 34 and 35 is, for example, an insulative resin such as an epoxy resin, a polyimide resin, or the like.

The wiring unit 23 includes wiring layers 41 to 43 and insulation layers 44 and 45. The wiring layer 41 is formed on the lower surface of the substrate body 21. The wiring layer 41 includes a signal wire and a power wire. The wiring layer 41 is covered by the insulation layer 44. The wiring layer 42 is formed on a lower surface of the insulation layer 44. The wiring layer 42 includes a signal wire and a power wire. The wiring layer 42 is covered by the insulation layer 45. The wiring layer 43 is formed on a lower surface of the insulation layer 45. The wiring layer 43 includes a plurality of wires. The material of the wiring layers 41 to 43 is, for example, copper. The material of the insulation layers 44 and 45 is, for example, an insulative resin such as an epoxy resin, a polyimide resin, or the like.

The wiring layer 43 is covered by a resist layer 46. Openings 46a are formed at given locations in the resist layer 46. The material of the resist layer 46 is, for example, an insulative resin such as an epoxy resin, an acrylic resin, or the like. A portion of the wiring layer 43 exposed from each opening 46a of the resist layer 46 defines a pad 43a used for external connection. An external connection terminal (e.g., bump) connected to a mounting substrate, such as a motherboard or the like, is arranged on the pad 43a. Alternatively, a metal layer may be formed on the exposed portion of the wiring layer 43, and the external connection terminal and the like may be connected to the metal layer. Examples of the metal layer include an Au layer, an Ni/Au layer, an Ni/Pd/Au layer, and the like. Alternatively, the exposed portions of the wiring layer 43 may be directly used as the external connection terminals. Alternatively, an OSP (Organic Solderability Preservative) film or a metal layer may be formed on the exposed portions of the wiring layer 43, and the OSP film or the metal layer may be used as external connection terminals.

The waveguide unit 12 is stacked on the upper surface of the insulation layer 35. The waveguide unit 12 includes a first clad layer 51, a core 52, a second ground wire 53, a second clad layer 54, and a reflector 55.

The first clad layer 51 covers the signal wire 33 formed on the upper surface of the insulation layer 35. The core 52 is formed on the upper surface of the first clad layer 51. Optical signals propagate through the core 52. The reflector 55 is arranged at one end of the core 52. The reflector 55 includes a mirror base 56 having a sloped surface inclined at a given angle (e.g., 45 degrees), and a reflection coating 57 formed on the sloped surface of the mirror base 56. The mirror base 56 changes the optical axis L1 of the photoelectric component 60 in the core 52. The reflection coating 57 is made of a material having satisfactory light reflectivity, for example, gold (Au), silver (Ag), aluminum (Al), or the like.

The second ground wire 53 is formed on an upper surface of the first clad layer 51. The second ground wire 53 is electrically connected to the first ground wire 32 by vias 91 (see FIG. 2). The material of the second ground wire 53 is, for example, copper. The core 52 and the second ground wire 53 are covered by the second clad layer 54. Thus, the first clad layer 51, the core 52, and the second clad layer 54 are stacked in order from the upper surface of the wiring substrate 11. That is, the core 52 is surrounded by the first clad layer 51 and the second clad layer 54. The second ground wire 53 is sandwiched between the first clad layer 51 covering the signal wire 33 and the second clad layer 54. The signal wire 33 is sandwiched between the first ground wire 32 of the wiring unit 22 and the second ground wire 53 of the waveguide unit 12.

Basically, the same material may be used for the first and second clad layers 51 and 54 and the core 52. For example, a resin material having transmissivity in a wavelength band of the light propagating through the core 52 may be used for the first and second clad layers 51 and 54 and the core 52. As such a resin material, for example, an acrylic resin such as polymethyl methacrylate (PMMA) and the like, an epoxy resin, a silicon resin, and the like may be used. However, the material of the core 52 is selected to have a higher index of refraction than the material of the first and second clad layers 51 and 54 that cover the core 52 so that optical signals propagate through only the core 52. The difference in the index of refraction of the core 52 and the first and second clad layers 51 and 54 is not particularly limited but is, for example, preferably about 0.3% to 5.5%, and more preferably, about 0.8% to 2.2%.

The photoelectric component 60 and the electronic component 70 are mounted on the waveguide unit 12. An electrode terminal 61 is arranged on one surface (lower surface in FIG. 1) of the photoelectric component 60. An opening 58a exposing a portion (one end) of the signal wire 33 as a connection pad 33a is formed in the first and second clad layers 51 and 54. The opening 58a is formed at a location corresponding to the electrode terminal 61 so that the optical axis L1 of the photoelectric component 60 conforms to the location of the reflector 55 (e.g., center of the sloped surface of the mirror base 56). The electrode terminal 61 is fitted into the opening 58a and electrically connected with the connection pad 33a. Therefore, the photoelectric component 60 is electrically connected to the signal wire 33 by the electrode terminal 61. In other words, the photoelectric component 60 is flip-chip mounted on the wiring substrate 11. For example, a gold bump or a solder bump may be used for the electrode terminal 61. For the material of the solder bump, for example, an alloy containing lead (Pb), an alloy of tin (Sn) and copper, an alloy of tin and silver (Ag), an alloy of tin, silver, and copper, and the like may be used.

An underfill resin 81 is arranged between the second clad layer 54 and the photoelectric component 60. The underfill resin 81 fills the opening 58a and a gap between the upper surface of the waveguide unit 12 (second clad layer 54) and the lower surface of the photoelectric component 60. An epoxy insulative resin, for example, may be used as the material of the underfill resin 81. The underfill resin 81 increases the connection strength of a portion connecting the electrode terminal 61 of the photoelectric component 60 and the connection pad 33a of the signal wire 33.

An electrode terminal 71 is arranged on one surface (lower surface in FIG. 1) of the electronic component 70. An opening 58b exposing a portion (other end) of the signal wire 33 as a connection pad 33b is formed in the first and second clad layers 51 and 54. The electrode terminal 71 is fitted into the opening 58b and electrically connected to the connection pad 33b. Therefore, the electronic component 70 is electrically connected to the signal wire 33 by the electrode terminal 71. The electronic component 70 is flip-chip mounted on the wiring substrate 11. For example, a gold bump or a solder bump may be used for the electrode terminal 71. As the material of the solder bump, for example, an alloy containing lead (Pb), an alloy of tin (Sn) and copper, an alloy of tin and silver (Ag), an alloy of tin, silver, and copper, and the like may be used.

An underfill resin 82 is arranged between the second clad layer 54 and the electronic component 70. The underfill resin 82 fills the opening 58b and a gap between the upper surface of the waveguide unit 12 (second clad layer 54) and the lower surface of the electronic component 70. An epoxy insulative resin, for example, may be used as the material of the underfill resin 82. The underfill resin 82 increases the connection strength of a portion connecting the electrode terminal 71 of the electronic component 70 and the connection pad 33b of the signal wire 33.

Figure 2:
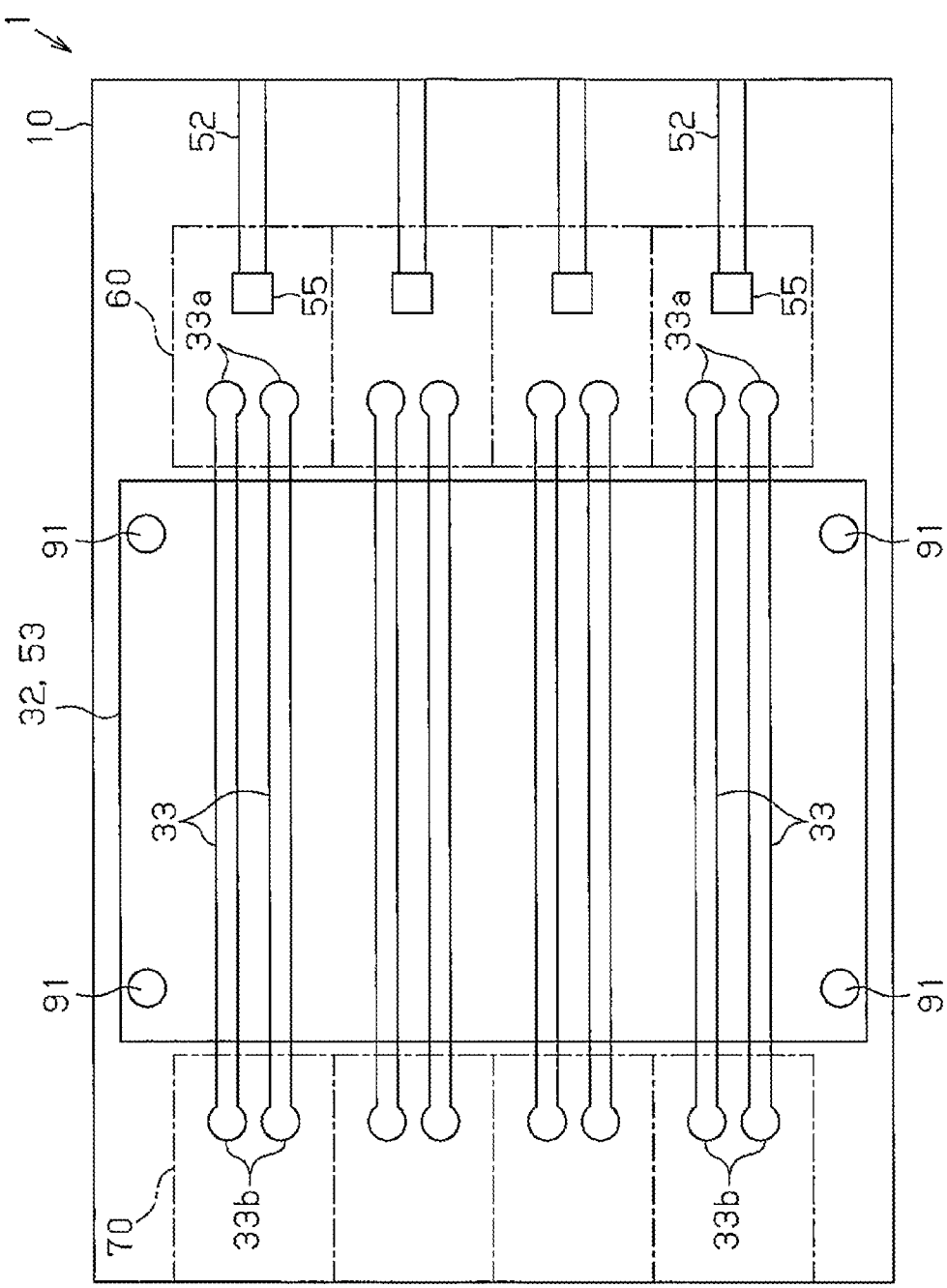
FIG. 2 is a schematic plan view illustrating the optical module of FIG. 1.

As illustrated in FIG. 2, the wiring substrate 11 includes a plurality of (eight in FIG. 2) signal wires 33. The signal wires 33 extend in a given first direction (sideward direction in FIG. 2) and are arranged in parallel next to one another on the same plane in a second direction (vertical direction in FIG. 2) which is orthogonal to the first direction. The first and second ground wires 32 and 53 may be, for example, tetragonal to cover the signal wires 33. The vias 91 formed at, for example, corners of the ground wires 32 and 53 electrically connect the first and second ground wires 32 and 53.

In FIG. 1, the thickness of the core 52 is, for example, 30 μm to 40 μm. The thickness of the first clad layer 51 is, for example, 10 μm to 60 μm. The thickness of the first clad layer 51 is preferably set such that the distance h1 between the first ground wire 32 and the signal wire 33 is equal to the distance h2 between the signal wire 33 and the second ground wire 53.

The operation of the optical module 1 will now be described.

As illustrated in FIG. 1, one end of the signal wire 33 arranged on the upper surface of the insulation layer 35 is connected to the electrode terminal 61 of the photoelectric component 60. The other end of the signal wire 33 is connected to the electrode terminal 71 of the electronic component 70. The insulation layer 35 covers the first ground wire 32. The second ground wire 53 is arranged on the upper surface of the first clad layer 51 covering the signal wire 33. The first and second ground wires 32 and 53 are electrically connected to each other by the vias 91 (see FIG. 2). The first and second ground wires 32 and 53 are electrically connected to, for example, the ground wire of the wiring layer 31.

Therefore, the first and second ground wires 32 and 53 and the signal wire 33 form a strip line. Thus, the first and second ground wires 32 and 53 reduce interference, or crosstalk, of the electric signals propagating through the signal wires 33 (see FIG. 2).

The potential at the first and second ground wires 32 and 53 is set to a given voltage (e.g., 0 V). Therefore, the first and second ground wires 32 and 53 function as shield plates for each signal wire 33 and reduce the amount of external noise superimposed on electric signals propagating through each signal wire 33.

The noise superimposed on electric signals inhibits the high-speed propagation of electric signals. Therefore, a reduction in the amount of noise superimposed on electric signals allows for the electric signals to be propagated at high speeds.

An optical module 200 of a comparative example will now be described. Same reference numerals are given to those components that are the same as the corresponding components of the optical module 1 in the embodiment described above. Such components will not be described in detail.

Figure 7:
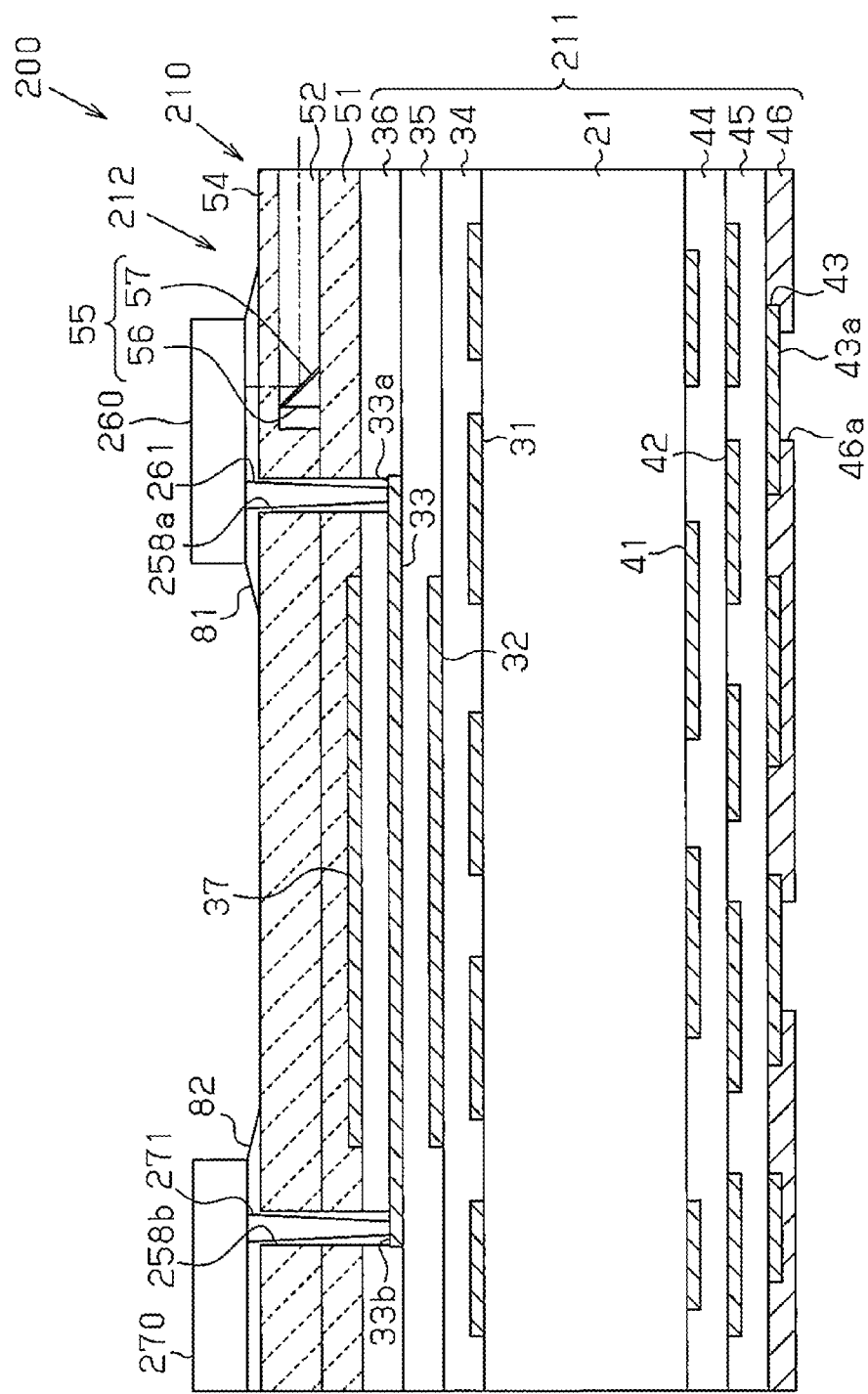
FIG. 7 is a schematic cross-sectional view illustrating an optical module of a comparative example.

As illustrated in FIG. 7, the optical module 200 includes a module substrate 210, the photoelectric component 60, and the electronic component 70. The photoelectric component 60 and the electronic component 70 are mounted on the module substrate 210. The module substrate 210 includes a wiring substrate 211 and a waveguide unit 212.

The wiring substrate 211 includes the substrate body 21. The wiring layer 31 and the insulation layer 34 that covers the wiring layer 31 are formed on the upper surface of the substrate body 21. The first ground wire 32 and the insulation layer 35 that covers the first ground wire 32 are formed on the upper surface of the insulation layer 34. The signal wire 33 and the insulation layer 36 that covers the signal wire 33 are formed on the upper surface of the insulation layer 35. The second ground wire 37 is formed on the upper surface of the insulation layer 36. The second ground wire 37 is formed in the same manner as the first ground wire 32.

The waveguide unit 212 includes the first clad layer 51, which covers the insulation layer 36 and the second ground wire 37, the core 52 arranged on the upper surface of the first clad layer 51, and the second clad layer 54, which covers the core 52. The photoelectric component 260 and the electronic component 270 are mounted on the second clad layer 54. The photoelectric component 260 includes an electrode terminal 261, and the electronic component 270 includes an electrode terminal 271.

The electrode terminal 261 of the photoelectric component 260 is connected to the connection pad 33a of the signal wire 33, which is exposed from an opening 258a formed in the clad layers 51 and 54 and the insulation layer 36. In the same manner, the electrode terminal 271 of the electronic component 270 is connected to the connection pad 33b of the signal wire 33, which is exposed from an opening 258b formed in the clad layers 51 and 54 and the insulation layer 36.

In the optical module 200 of the comparative example, the first clad layer 51 covers the second ground wire 37, which is arranged on the upper surface of the insulation layer 36. The photoelectric component 260 and the electronic component 270 are electrically connected to the signal wire 33 by the electrode terminals 261 and 271 that are respectively fitted into the openings 258a and 258b formed in the clad layers 51 and 54 and the insulation layer 36. Therefore, the openings 258a and 258b extend through the clad layers 51 and 54 and the insulation layer 36 from the upper surface of the second clad layer 54 to the connection pads 33a and 33b of the signal wire 33. The electrode terminals 261 and 271 have lengths corresponding to the lengths of the openings 258a and 258b.

As illustrated in FIG. 1, in the optical module 1 of the present embodiment, the first clad layer 51 covers the signal wire 33, and the second ground wire 53 is arranged on the first clad layer 51. The photoelectric component 60 and the electronic component 70 are electrically connected to the signal wire 33 by the electrode terminals 61 and 71 that are respectively fitted into the openings 58a and 58b formed in the clad layers 51 and 54. Thus, the distance between the photoelectric component 60 and the signal wire 33 is shorter than that of the comparative example illustrated in FIG. 7. Likewise, the distance between the electronic component 70 and the signal wire 33 is shorter than that of the comparative example.

When the distance between the photoelectric component 60 and the signal wire 33 is long, noise is easily superimposed on electric signals propagating between the photoelectric component 60 and the signal wire 33. In the same manner, when the distance between the electronic component 70 and the signal wire 33 is long, noise is easily superimposed on electric signals propagating between the electronic component 70 and the signal wire 33. Accordingly, connection of the photoelectric component 60 and the electronic component 70 to the signal wire 33 at a short distance like in the present embodiment reduces noise that is superimposed on electric signals.

A method for manufacturing the optical module 1 will now be described.

First, the steps performed until reaching the situation illustrated in FIG. 3A will be described. The wiring layer 31, the insulation layer 34, the first ground wire 32, the insulation layer 35, and the signal wire 33 are formed in order on the upper surface of the substrate body 21. The wiring layer 31, the first ground wire 32, and the signal wire 33 are formed by performing, for example, a semi-additive process, a full-additive process, a subtractive process, or the like. The insulation layers 34 and 35 are formed by, for example, compression-bonding a resin film.

The first clad layer 51 that covers the signal wire 33 is then formed on the upper surface of the insulation layer 35. For example, a photosensitive resin layer is formed on the entire upper surface of the insulation layer 35. Then, the photosensitive resin layer is cured to form the first clad layer 51. The photosensitive resin layer may be formed by applying a liquid photosensitive resin over the entire upper surface of the insulation layer 35 or by covering the entire surface of the insulation layer 35 with a photosensitive resin sheet in a half-cured state. The photosensitive resin is, for example, an ultraviolet (UV) curable resin. The material of the UV curable resin may be, for example, a resin material containing a base resin of a modified acrylate (epoxy resin, polyester resin, etc.), a reactive acryl monomer needed for photo polymerization, a photo polymerization initiator, and an additive. The main reaction of the UV curable resin is radical polymerization. The UV curable resin may be processed under normal temperatures. Further, UV curable resin cures within a shorter period than thermosetting resin. This reduces the manufacturing time. As will be described later, in the present embodiment, the core 52 and the second clad layer 54 are also formed from photosensitive resin layer. This allows the same photosensitive resin material to be used for the first and second clad layers 51 and 54 and the core 52.

Referring to FIG. 3B, the mirror base 56 is formed. The mirror base 56, for example, is formed by forming the photosensitive resin, carrying out exposure and development using the photolithography method, curing the photosensitive resin, and processing the cured resin with a blade having a given shape.

Referring to FIG. 3C, a seed layer 101 is formed with a shaped conforming to the second ground wire 53 illustrated in FIG. 1. At the same time, the reflection coating 57 is also formed. For example, a resist film is formed over the entire upper surface of the structure illustrated in FIG. 3B. Then, photolithography, for example, is performed on the resist film to form openings that expose the sloped surface of the mirror base 56 and a region where the seed layer 101 is formed. Then, for example, gold (Au) is vapor deposited through the openings to form the seed layer 101 and the reflection coating 57. Subsequently, the remaining resist film is removed. The reflection coating 57 and the seed layer 101 may be formed through processes such as metal sputtering and the like.

Then, as illustrated in FIG. 4A, a plated layer 102 is formed. For example, a resist film is formed over the entire upper surface of the structure illustrated in FIG. 3C. Then, for example, photolithography is performed on the resist film to form an opening that exposes the seed layer 101. Electroless copper plating, for example, is then performed using the resist film as a mask to form a copper plated layer 102 on the seed layer 101. The seed layer 101 and the plated layer 102 form the second ground wire 53 with a given thickness, as illustrated in FIG. 1. The plated layer 102 may be formed by performing electrolytic plating using the seed layer 101 as an electrode. In the drawings that are referred to in the following description, the seed layer 101 and the plated layer 102 are indicated as the second ground wire 53.

Next, as illustrated in FIG. 4B, the core 52 and the second clad layer 54 are formed. For example, a photosensitive resin layer is formed to cover the entire upper surface of the structure illustrated in FIG. 4A. Then, photolithography is performed to subject the photosensitive resin layer to exposure and development, and the photosensitive resin layer is cured to form the core 52. The second clad layer 54 that covers the second core 52 is then formed. For example, a photosensitive resin layer is formed to cover the first clad layer 51, the core 52, and the entire upper surface of the second ground wire 53. Then, photolithography is performed to subject the photosensitive resin layer to exposure and development, and the photosensitive resin layer is cured to form the second clad layer 54.

Then, as illustrated in FIG. 4C, the openings 58a and 58b for exposing the upper surface of the end of the signal wire 33 are formed in the clad layers 51 and 54. Laser processing is performed using, for example, a gas laser (e.g., $CO_2$ laser) or a solid-state laser (e.g., UV-YAG laser) to form the openings 58a and 58b. Photolithography may be performed to form the openings 58a and 58b.

The present embodiment has the advantages described below.

(1) The photoelectric component 60 and the electronic component 70 are mounted on the module substrate 10 of the optical module 1. The module substrate 10 includes the wiring substrate 11 and the waveguide unit 12, which is arranged on the upper surface of the wiring substrate 11. The wiring unit 22 of the wiring substrate 11 includes the wiring layer 31, the first ground wire 32, the signal wire 33, and the insulation layers 34 and 35. The waveguide unit 12 includes the first clad layer 51, the core 52, the second ground wire 53, and the second clad layer 54. The first clad layer 51, which is formed on the upper surface of the wiring substrate 11, covers the signal wire 33. The core 52 and the second ground wire 53 are formed on the first clad layer 51. The second clad layer 54 covers the core 52. The photoelectric component 60 is mounted on the second clad layer 54 and connected to the signal wire 33 by the electrode terminal 61. The electronic component 70 is mounted on the second clad layer 54 and connected to the signal wire 33 by the electrode terminal 71.

The signal wires 33 (see FIG. 2) are formed on the wiring substrate 11. The signal wires 33 are sandwiched between the first ground wire 32, which is formed in the wiring substrate 11, and the second ground wire 53, which is formed in the waveguide unit 12. Accordingly, the signal wires 33 and the first and second ground wire 32 and 53 form a strip line. The strip line reduces crosstalk between the signal wires 33. This enables high-speed transmission of electric signals in the signal wires 33.

(2) The connection pads 33a of the signal wires 33 are connected to the photoelectric component 60 by the electrode terminals 61 fitted into the openings 58a extending through the first and second clad layers 51 and 54. The connection pads 33b of the signal wires 33 are connected to the electronic component 70 by the electrode terminals 71 fitted into the openings 58b extending through the first and second clad layers 51 and 54.

This shortens the distance between the signal wire 33 and the photoelectric component 60 and the distance between the signal wire 33 and the electronic component 70 compared to the wiring substrate 211 of the comparative example illustrated in FIG. 7 in which the second ground wire 37 is formed on the insulation layer 36. Accordingly, the photoelectric component 60 and the electronic component 70 are connected to the signal wire 33 within a short distance. This reduces the amount of noise superimposed on electric signals transmitted through the signal wires 33 between the photoelectric component 60 and the electronic component 70. As a result, electric signals are transmitted at high speeds through the signal wires 33 between the photoelectric component 60 and the electronic component 70.

(3) The second ground wire 53 is formed on the first clad layer 51, which covers the signal wires 33. Accordingly, the number of insulation layers is reduced compared to the wiring substrate 211 of the comparative example illustrated in FIG. 7 in which the second ground wire 37 is formed on the insulation layer 36 covering the signal wires 33. This reduces the material (insulative resin, etc.) used to form the wiring substrate 11. Further, the reduction in the number of insulation layers reduces the number of steps for manufacturing the wiring substrate 11. This lowers the manufacturing cost of the wiring substrate 11 and thus lowers the cost of the wiring substrate 11.

It should be apparent to those skilled in the art that the present invention may be embodied in many other specific forms without departing from the spirit or scope of the invention. Particularly, it should be understood that the present invention may be embodied in the following forms.

Figure 5A:
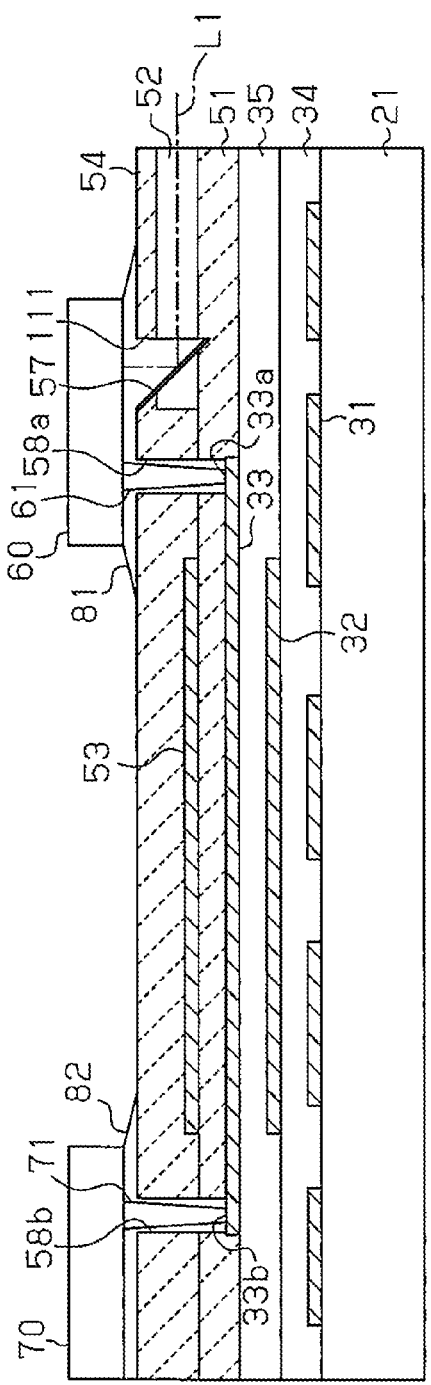

The shape of the waveguide unit 12 may be changed. For example, as illustrated in FIG. 5A, a groove 111 having a sloped surface may be formed in the first and second clad layers 51 and 54 and the core 52, and the reflection coating 57 may be formed on the sloped surface of the groove 111. The reflection coating 57 changes the optical axis L1 of the photoelectric component 60 in the core 52. The underfill resin 81 is formed in the gap between the photoelectric component 60 and the second clad layer 54. Further, the groove 111 is filled with the underfill resin 81. Resin material having transmissivity in the wavelength band of the light propagating through the core 52 is preferably used as the material of the underfill resin 81. For example, the same resin material as the first and second clad layers 51 and 54 and the core 52 may be used as the material of the underfill resin 81.

Figure 5B:
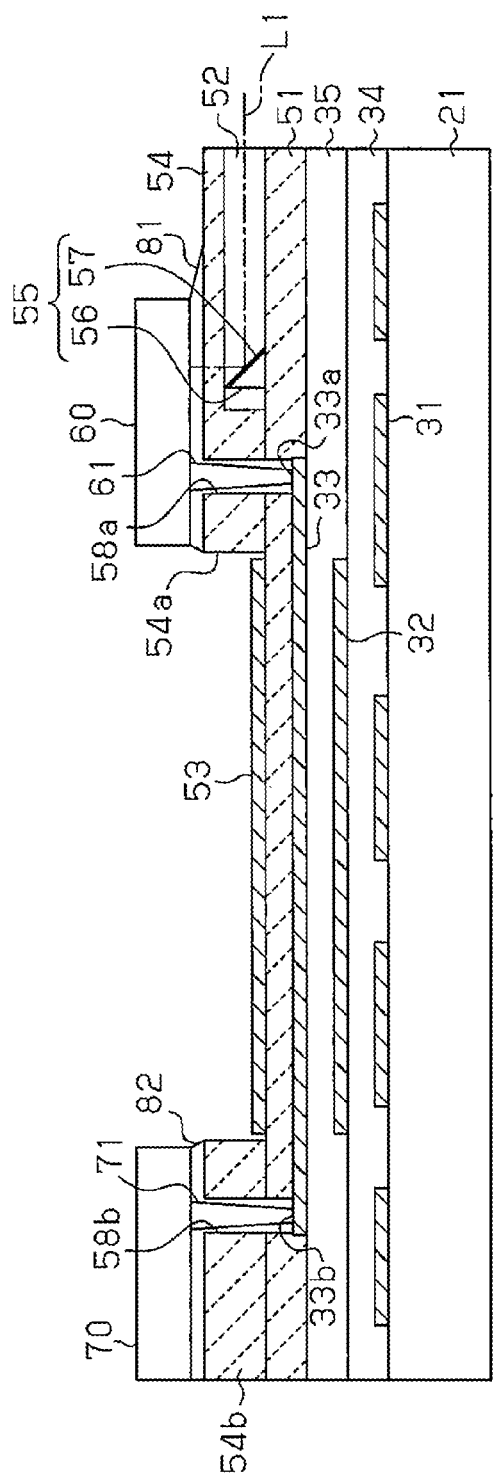

As illustrated in FIG. 5B, an opening 54a that exposes the second ground wire 53 may be formed in the second clad layer 54. Alternatively, the opening 54a may be formed to expose a portion of the second ground wire 53.

The second clad layer 54 preferably covers the core 52. Accordingly, in FIG. 5B, the second clad layer 54b under the electronic component 70 may be omitted, and the electronic component 70 may be mounted on the first clad layer 51. This allows the electrode terminal 71 to be shortened that connects the electronic component 70 to the signal wire 33.

In the embodiment described above, the second ground wire 53 is formed on the first clad layer 51, as illustrated in FIG. 1. However, the signal wires 33 may be formed on the first clad layer 51.

For example, as illustrated in FIG. 6A, the first clad layer 51 is formed to cover the first ground wire 32 and the insulation layer 34. The signal wire 33 is formed on the upper surface of the first clad layer 51. The second clad layer 54 is then formed to cover the signal wire 33, and the second ground wire 53 is formed on the upper surface of the second clad layer 54. The second ground wire 53 is electrically connected to the first ground wire 32 by the vias 91 illustrated in FIG. 2. In this structure, the distance from the electronic component 70 and the photoelectric component 60 to the signal wire 33, that is, the length of the electrode terminals 61 and 71 may be reduced compared to the structure illustrated in FIG. 1. Accordingly, the signal wire 33 may be connected to the electronic component 70 and the photoelectric component 60 within a shorter distance. This allows for reduction in the amount of noise superimposed on electric signal transmitted between the electronic component 70 and the photoelectric component 60.

As illustrated in FIG. 6B, the core 52 may be formed to cover the signal wires 33. A flat core portion 52a of the core 52 covers the signal wires 33. The second ground wire 53 is formed on the flat core portion 52a. The second clad layer 54 covers the cores 52 and 52a.

The structure of the wiring substrate 11 may be changed. For example, in FIG. 1, the wiring unit 23 may be omitted, and pads connected to the mounting substrate may be formed on the lower surface of the substrate body 21.

The present examples and embodiments are to be considered as illustrative and not restrictive, and the invention is not to be limited to the details given herein, but may be modified within the scope and equivalence of the appended claims.

The invention claimed is:

1. A photoelectric mixed substrate on which a photoelectric component and an electronic component are mounted, the photoelectric mixed substrate comprising:
 a wiring substrate including a first ground wire;
 a signal wire arranged above the first ground wire, wherein the signal wire electrically connects the photoelectric component and the electronic component; and
 a waveguide unit stacked on the wiring substrate, wherein the waveguide unit covers the signal wire, and the waveguide unit includes
  a first clad layer formed on the wiring substrate,
  a second ground wire formed above the first clad layer,
  a core formed on the first clad layer and optically coupled to the photoelectric component, and
  a second clad layer formed on the first clad layer, wherein the second clad layer covers the core.

2. The photoelectric mixed substrate according to claim 1, wherein
 the signal wire is one of a plurality of signal wires arranged in parallel, and
 the plurality of signal wires is sandwiched in a stacking direction between the first ground wire and the second ground wire.

3. The photoelectric mixed substrate according to claim 1, wherein
 the wiring substrate includes an insulation layer that covers the first ground wire,
 the signal wire is formed on the insulation layer,
 the first clad layer covers the signal wire, and
 the second ground wire is formed on the first clad layer.

4. The photoelectric mixed substrate according to claim 1, wherein
 the first clad layer covers the first ground wire,
 the signal wire is formed on the first clad layer, and
 the second ground wire is formed on the second clad layer or the core.

5. An optical module comprising:
 a photoelectric component;
 an electronic component; and
 a photoelectric mixed substrate on which the photoelectric component and the electronic component are mounted, wherein the photoelectric mixed substrate includes
  a wiring substrate including a first ground wire, a signal wire arranged above the first ground wire, wherein the signal wire electrically connects the photoelectric component and the electronic component, and a waveguide unit stacked on the wiring substrate, wherein the waveguide unit covers the signal wire, and the waveguide unit includes a first clad layer formed on the wiring substrate, a second ground wire formed above the first clad layer, a core formed on the first clad layer and optically coupled to the photoelectric component, and a second clad layer formed on the first clad layer, wherein the second clad layer covers the core.

* * * * *